B. G. MARTIN.
Mash Tun for Brewers.
No. 51,518.
Patented Dec. 12, 1865.
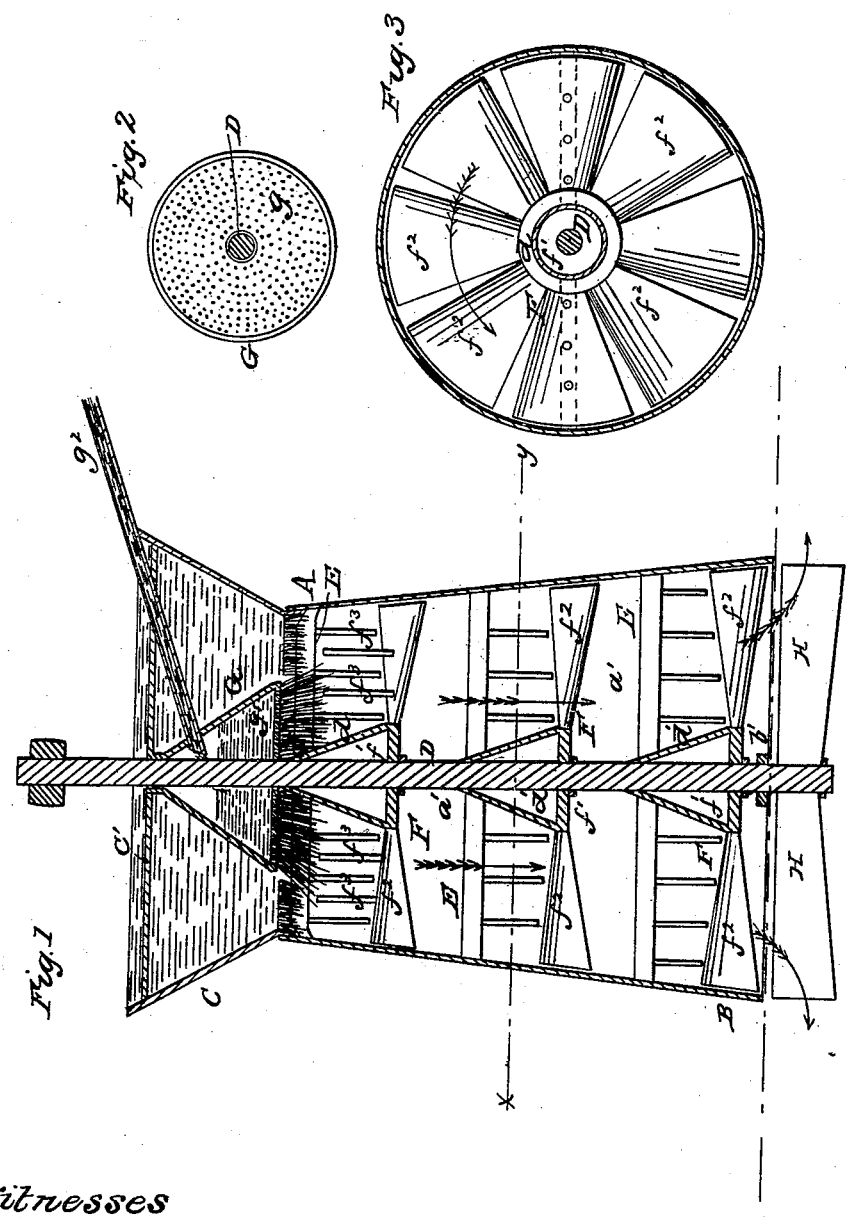

UNITED STATES PATENT OFFICE.

BENJAMIN G. MARTIN, OF PHILADELPHIA, PENNSYLVANIA, ASSIGNOR TO HIMSELF, THOS. M. DAVIS, L. H. WALTON, AND WATSON SANFORD.

IMPROVED MASH-TUN FOR BREWERS.

Specification forming part of Letters Patent No. 51,518, dated December 12, 1865; antedated November 30, 1865.

*To all whom it may concern:*

Be it known that I, BENJAMIN G. MARTIN, of the city of Philadelphia, in the State of Pennsylvania, have invented a new and useful Improvement in the Brewers' Mashing-Machines; and I do hereby declare that the following is a full, clear, and exact description of the construction and operation of the same, reference being had to the accompanying drawings, making a part of this specification, in which—

Figure 1 is a vertical central section of the said improved machine; Fig. 2, a plan view of the bottom of its sparger or water-spreader; and Fig. 3, a transverse section of the machine cut on the dotted line $xy$ of Fig. 1, like letters of reference indicating the same parts when in the different figures.

The general object of my invention is to produce a mashing-machine that will more perfectly and rapidly mix the ground malt with the water and require less operating power than the mashing-machine tuns heretofore used for the purpose.

It consists, substantially as hereinafter described and set forth, first, in the application to a shaft, arranged vertically to rotate in the center of a circular case which is open at top and bottom, and also provided with a capacious hopper at its upper end, of a series of horizontal wheels, provided with obliquely-arranged radial paddles, so as to operate together in the said case, in combination with alternating series of horizontal rakes fixed by their ends to the sides of the case, for the purpose of more thoroughly and quickly mixing the ground malt and water while the latter are passing downward through the same from the hopper, and before reaching the usual receiving-tun; second, in the application of a sparger or water-spreader to the said hopper or upper end of the mixing-case, in combination with a water-supply pipe opening into it, the same being so constructed and arranged as to distribute the water thoroughly among the particles of ground malt as the same fall from the hopper into the case; and, third, in the application to the said shaft, carrying the paddle-wheels mentioned at a point thereof a little below the lower end of the mixing-case, of a series of vertically-fixed radial paddles, for the purpose of serving as distributers of the mixed malt and water or mash as it passes from the said mixing-case into any suitable mash-receiving tun below.

In the drawings, A B are the circular case; C, the hopper; D, the shaft; E E, the rakes; F F, the horizontal paddle-wheels; G, the sparger; and H H the vertical-radial distributing-paddles beneath the case.

The case A B in this instance is in the form of a hollow conical frustum, the smaller end being the top, and having the hopper C applied to it, so as to support the shaft D vertically in its center by means of a suitable bearing in the arm $c'$, and a similar support, $b'$, near the bottom of the case A B. It is of much smaller diameter than the usual mash-receiving tun, and is intended to be placed above the latter, the capacity of which being thus freed from obstructions.

The rakes E are fixed horizontally across the case A B, and the wheels F are fixed on, and are therefore carried around together by the rotatory motion of, the shaft D. The rakes and wheels are arranged so as to be near each other, in three or more horizontal series, with a vacant space, $a'$, between each two series, as shown in Fig. 1. The rakes should be made of galvanized iron.

The wheels F consist each of a central disk, $f'$, and a series of radial paddles, $f^2 f^2$, cut out of galvanized-iron plate, and attached to the said disk $f'$, so as to be radial, and also in oblique positions to the plane of the wheel, their obliquity being such as to make them serve, when the wheel is in motion, as downward propellers of the contents of the case. They are each attached to the shaft D by means of a conical enlargment, $d'$, fixed around on the said shaft, which enlargements serve also as deflectors, to give the passing fluid a direction toward the periphery of each wheel. The upper wheel has a row of vertical teeth, $f^3$, which pass between the rake-teeth above as the wheel rotates.

The sparger G is a hollow conical case having a perforated bottom, $g'$, a plan view of which is shown in Fig. 2, into which a water-supply pipe, $g^2$, opens. The sparger G is fixed to the hopper by means of the stay-piece $c'$, and allows the shaft D to rotate freely in its center.

The distributing-paddles H are fixed to and near the lower end of the shaft D, or a little below the case A B, in vertical radial positions, are made of galvanized sheet-metal, and should be three or four in number, arranged at equal distances apart.

Operation: The case A B is to be placed directly and entirely over a mash-tun which will be sufficiently capacious to receive and hold the quantity of mash required at any one time, and the shaft then put in motion at the rate of about four hundred, more or less, rotations per minute. The hopper C is now to be kept fully supplied with the ground malt and the sparger G with water, while both of them are yielding their contents rapidly to the case A B below, which contents become most rapidly and thoroughly mixed by the action of the wheels F, in connection with that of the rakes E, through which the mixture passes in a broken spiral direction downward to the distributers H, which latter scatter it around in the receiving-tun below as a complete mash.

It will be seen that this mixing-machine, being of a much less diameter than the mashing-machines in use, will require proportionately less power to operate it, while its effectiveness in mixing or mashing will be greater and more rapid than any mashing-machine operating upon the whole mass at one time in mashing as heretofore; and, moreover, it being required to be placed above the usual receiving-tun, it will be seen that it does not occupy or interfere with any portion of the capacity of the same below the distributing-paddles H.

I wish it to be understood that I do not intend to confine myself, in the construction of this mashing machine or mixer, to any particular dimensions of the devices thereof, nor to the number of the series of rakes and paddle-wheels, or their distances apart, nor to the precise arrangement shown of the several parts in their relation to each other; but having fully described my improved mashing-machine, and pointed out its peculiarities and advantages or utility,

What I claim as new therein of my invention, and desire to secure by Letters Patent, is—

1. The case A B, hopper C, shaft D, and paddle-wheels F F, the same being constructed and arranged to operate together, in combination with the rakes E E, or their equivalents, substantially as and for the purpose specified.

2. The sparger G, in combination with the supply-pipe $g'$, or its equivalent, and the hopper C, the same being constructed and arranged to operate together, substantially as and for the purpose described.

3. The application of the distributing-paddles H H to the shaft D, the said paddles being constructed and arranged to operate below the case A B, as and for the purpose described, when the mixing-machine herein described is placed directly over any suitable mash-receiving tun, as described.

BENJAMIN GREEN MARTIN.

Witnesses:
 BENJ. MORISON,
 B. F. SHATTUCK.